US012546390B2

(12) United States Patent
Takeuchi et al.

(10) Patent No.: US 12,546,390 B2
(45) Date of Patent: Feb. 10, 2026

(54) VEHICLE DRIVE DEVICE

(71) Applicants: AISIN CORPORATION, Aichi (JP); BLUE NEXUS CORPORATION, Aichi (JP)

(72) Inventors: Kento Takeuchi, Kariya (JP); Takahiro Morimoto, Kariya (JP); Yomei Hakumura, Anjo (JP)

(73) Assignees: AISIN CORPORATION, Kariya (JP); BLUE NEXUS CORPORATION, Anjo (JP)

( * ) Notice: Subject to any disclaimer, the term of this patent is extended or adjusted under 35 U.S.C. 154(b) by 312 days.

(21) Appl. No.: 18/266,347

(22) PCT Filed: Jan. 27, 2022

(86) PCT No.: PCT/JP2022/003163
§ 371 (c)(1),
(2) Date: Jun. 9, 2023

(87) PCT Pub. No.: WO2022/196126
PCT Pub. Date: Sep. 22, 2022

(65) Prior Publication Data
US 2024/0026967 A1    Jan. 25, 2024

(30) Foreign Application Priority Data
Mar. 16, 2021  (JP) ................. 2021-042921

(51) Int. Cl.
*F16H 57/04*    (2010.01)
*B60K 11/02*    (2006.01)
(Continued)

(52) U.S. Cl.
CPC ......... *F16H 57/0435* (2013.01); *B60K 25/02* (2013.01); *F16H 57/0436* (2013.01); *F16H 57/0473* (2013.01); *H02P 29/60* (2016.02)

(58) Field of Classification Search
CPC ............ F16H 57/0435; F16H 57/0436; F16H 57/0473; F16H 57/0413; F16H 57/0439;
(Continued)

(56) References Cited

U.S. PATENT DOCUMENTS

| 7,953,533 | B2 | 5/2011 | Tsuda |
| 8,480,537 | B2 | 7/2013 | Sano et al. |
| 2012/0130576 | A1* | 5/2012 | Sugiyama ............. E02F 9/2091 903/903 |

FOREIGN PATENT DOCUMENTS

| JP | 2016-93036 A | 5/2016 |
| JP | 2020-111246 A | 7/2020 |
| JP | 2020-165461 A | 10/2020 |

OTHER PUBLICATIONS

Mar. 29, 2022 International Search Report issued in International Patent Application No. PCT/JP2022/003163.
(Continued)

*Primary Examiner* — Tisha D Lewis
(74) *Attorney, Agent, or Firm* — Oliff PLC (57) ABSTRACT

A vehicle drive device includes a drive shaft to be driven by a drive source, a rotation transmission unit that transmits rotation input from the drive shaft to a wheel, a mechanical oil pump that generates a hydraulic pressure by the rotation of the drive shaft, an electric oil pump that electrically generates a hydraulic pressure, a hydraulic control device that supplies lubricating oil to the rotation transmission unit based on the hydraulic pressures generated by the mechanical oil pump and the electric oil pump, a drive circuit that controls electric power to be supplied to the electric oil pump, and a control unit that controls a drive condition of the drive circuit. The control unit stops the drive circuit and shuts down the electric oil pump when a temperature of (Continued)

refrigerant for cooling the drive circuit is equal to or higher than a third start temperature.

2 Claims, 4 Drawing Sheets

(51) Int. Cl.
*B60K 25/02* (2006.01)
*H02P 29/60* (2016.01)

(58) Field of Classification Search
CPC ....... F16H 57/0476; B60K 25/02; B60K 1/02; B60K 2001/003; B60K 2001/006; B60K 11/02; H02P 29/60; B60L 2240/36; B60L 2240/425; B60L 2240/445; B60L 15/20; B60L 50/16
See application file for complete search history.

(56) References Cited

OTHER PUBLICATIONS

Sep. 17, 2024 Search Report issued in European Patent Application No. 22770888.0.

\* cited by examiner

VEHICLE DRIVE DEVICE

This is a U.S. National Phase of PCT/JP2022/003163 filed Jan. 27, 2022, which claims the benefit of JP 2021-042921 filed Mar. 16, 2021. The disclosure of the prior applications is hereby incorporated by reference herein in its entirety.

TECHNICAL FIELD

The present disclosure relates to a vehicle drive device including an electric oil pump.

BACKGROUND ART

In vehicles such as hybrid electric vehicles, there is a proposal that various parts are cooled by separating, into different systems, a high-temperature coolant for mainly cooling an engine and a low-temperature coolant for mainly cooling a motor and an inverter circuit (see Patent Document 1). In Patent Document 1, the high-temperature coolant (high-temperature refrigerant) is cooled to a target temperature of about 90° C. by a high-temperature radiator, and the low-temperature coolant (low-temperature refrigerant) is cooled to a target temperature of 65° C. or lower by a low-temperature radiator.

RELATED ART DOCUMENTS

Patent Documents

Patent Document 1: Japanese Unexamined Patent Application Publication No. 2020-111246 (JP 2020-111246 A)

SUMMARY OF THE DISCLOSURE

Vehicle drive devices such as a hybrid drive device often include a mechanical oil pump that is driven by a drive source such as an engine to generate a hydraulic pressure, and an electric oil pump that can generate a hydraulic pressure even while the drive source is stopped. In a drive circuit such as an inverter that drives the electric oil pump, the upper limit of a permissible current decreases particularly when the temperature increases. In a case where a high-temperature coolant and a low-temperature coolant are provided as in Patent Document 1, cooling with the low-temperature coolant is preferred. When the low-temperature coolant is also used to cool a traction motor such as a rear motor, however, the temperature of the low-temperature coolant may be higher than the target temperature. In that case, a thermal load may be caused on the drive circuit for the electric oil pump.

In view of this, it is an object of the present disclosure to provide a vehicle drive device capable of protecting a drive circuit for an electric oil pump.

Means for Solving the Problem

A vehicle drive device according to one aspect of the present disclosure includes:
a drive shaft to be driven by a drive source;
a rotation transmission unit that transmits rotation input from the drive shaft to a wheel;
a mechanical oil pump that generates a hydraulic pressure by the rotation of the drive shaft;
an electric oil pump that electrically generates a hydraulic pressure;
a hydraulic control device that supplies lubricating oil to the rotation transmission unit based on the hydraulic pressures generated by the mechanical oil pump and the electric oil pump;
a drive circuit that controls electric power to be supplied to the electric oil pump; and
a control unit that is able to control a drive condition of the drive circuit, in which
the control unit stops the drive circuit when a temperature of refrigerant for cooling the drive circuit is equal to or higher than a first temperature.

Therefore, the drive circuit is stopped when the temperature of the refrigerant for cooling the drive circuit for the electric oil pump is equal to or higher than the first temperature. Thus, a current equal to or larger than the permissible current can be prevented from flowing into the drive circuit, thereby protecting the drive circuit.

MODES FOR CARRYING OUT THE DISCLOSURE

Figure 1:
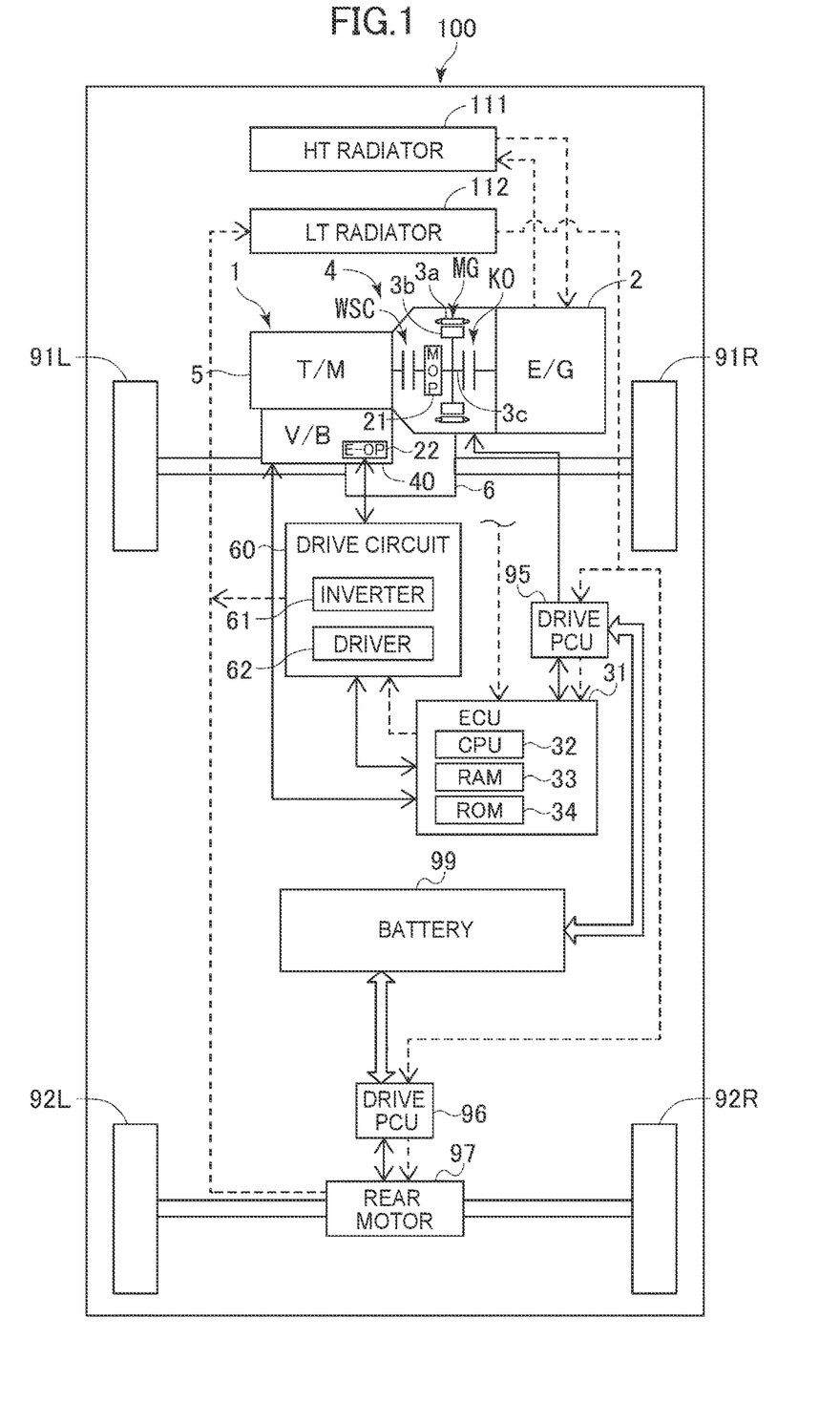
FIG. 1 is a block diagram showing a schematic configuration of a hybrid electric vehicle according to an embodiment.
Figure 2:
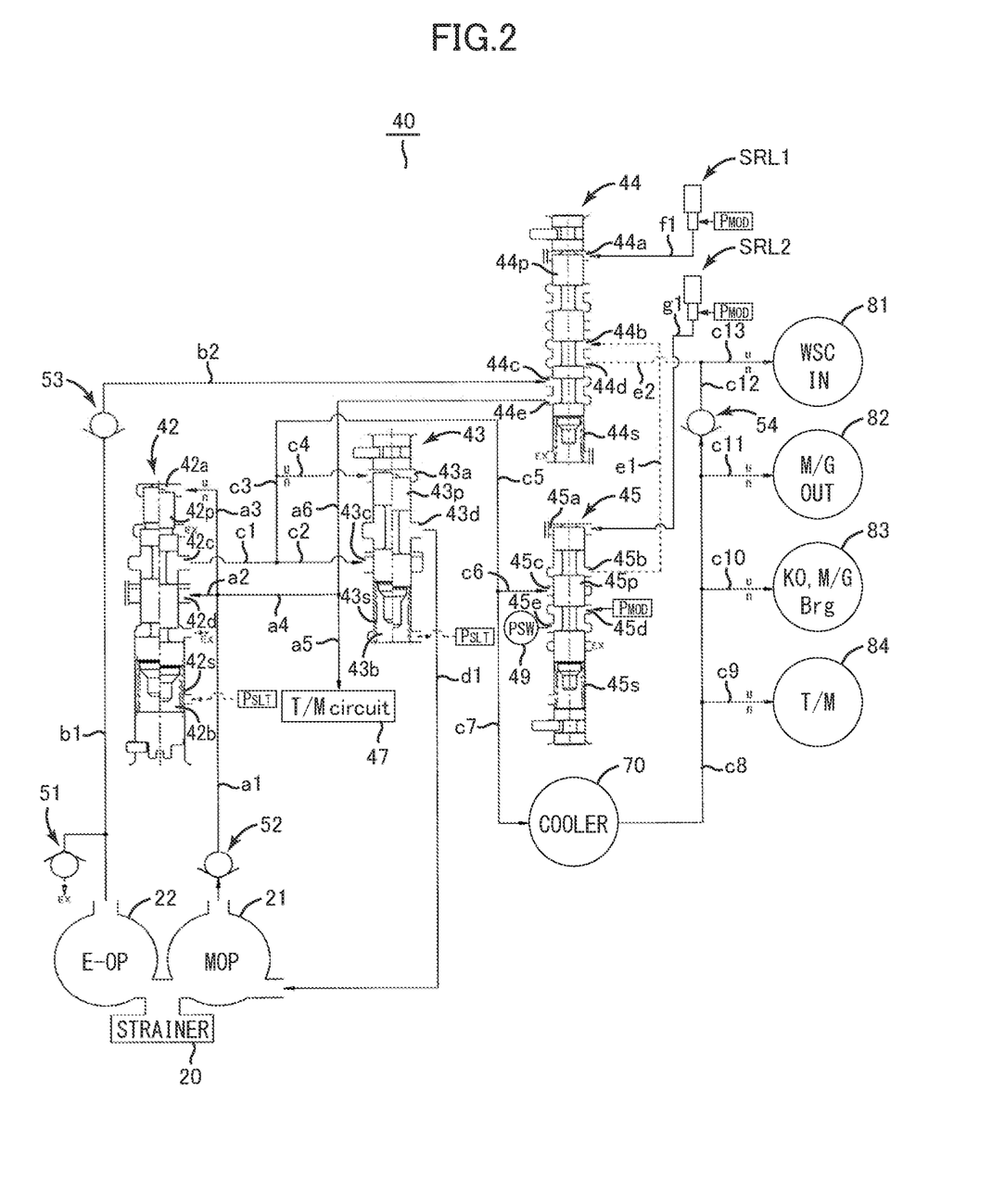
FIG. 2 is a hydraulic circuit diagram showing a part of a hydraulic control device according to the embodiment.
Figure 3:
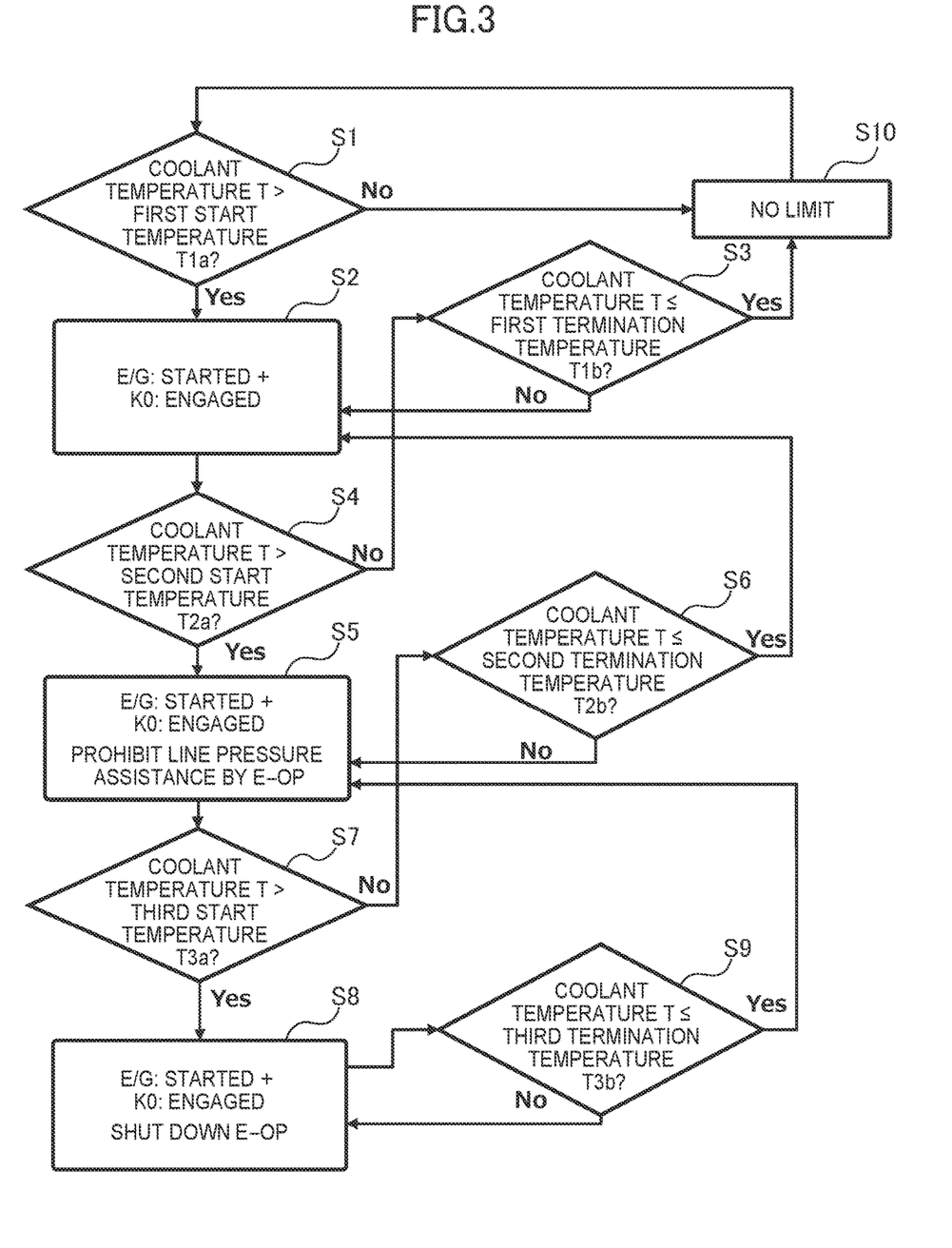
FIG. 3 is a flowchart showing coolant temperature handling control according to the embodiment.
Figure 4:
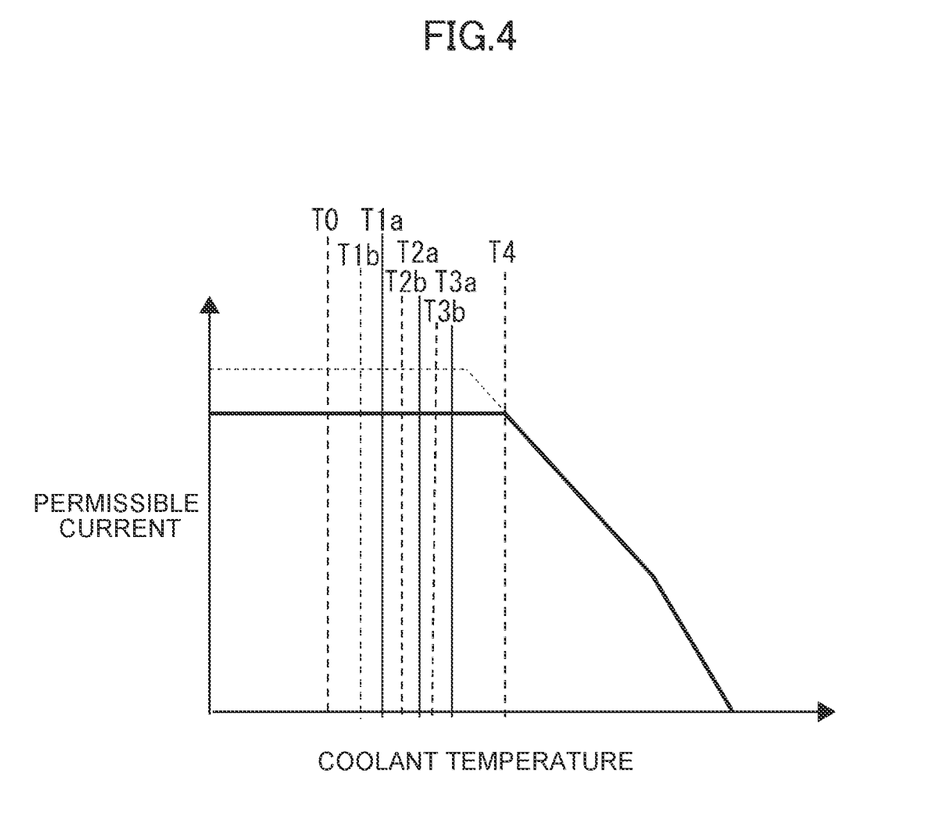
FIG. 4 is a graph showing a relationship between a permissible current and a coolant temperature in a drive circuit and a determination temperature in coolant temperature control according to the embodiment.

Hereinafter, an embodiment will be described with reference to FIGS. 1 to 4. FIG. 1 is a block diagram showing a schematic configuration of a vehicle according to the present embodiment. FIG. 2 is a hydraulic circuit diagram showing a part of a hydraulic control device according to the present embodiment. FIG. 3 is a flowchart showing coolant temperature control according to the present embodiment. FIG. 4 is a graph showing a relationship between a permissible current and a coolant temperature in a drive circuit and a determination temperature in the coolant temperature control according to the present embodiment.

[Configuration of Hybrid Electric Vehicle]

As shown in FIG. 1, a hybrid electric vehicle 100 according to the present embodiment includes a hybrid drive device 1 that is an example of a vehicle drive device and includes an engine (E/G) 2 and a front-wheel rotary electric machine (hereinafter simply referred to as "motor") MG as drive sources for driving left and right front wheels 91L, 91R that are wheels on a front side, and a rear-wheel rotary electric machine (hereinafter referred to as "rear motor") 97 for driving left and right rear wheels 92L, 92R. That is, the hybrid electric vehicle 100 can travel by front-wheel drive while traveling by using a driving force of the engine 2 and/or the motor MG, can perform four-wheel drive by drive of the rear motor 97, and can perform EV traveling by the motor MG and/or the rear motor 97.

A drive PCU 96 includes a circuit for controlling the motor MG by PWM, and performs power running of the rear motor 97 by supplying electric power from a battery 99 to the rear motor 97, or charges the battery 99 with electric power generated by regeneration in the rear motor 97. A differential device (not shown) is disposed between the rear motor 97 and the left and right rear wheels 92L, 92R to smooth out differential rotation between the left and right rear wheels 92L, 92R and transmit drive rotation of the rear motor 97 to the left and right rear wheels 92L, 92R.

The hybrid drive device 1 roughly includes a rotation transmission unit 4 that transmits the rotation of the engine 2 to the front wheels 91L, 91R, a hydraulic control device 40 including an electric oil pump (E-OP) 22, a differential device 6, a control unit (ECU) 31, a drive circuit 60 for the electric oil pump 22, and a drive power control unit (hereinafter referred to as "drive PCU") 95. The rotation transmission unit 4 includes a clutch K0 as an engine disconnecting clutch, the motor MG, a starting clutch WSC, and a transmission mechanism (T/M) 5 that shifts the rotation of the engine 2 and transmits it to the wheels.

The clutch K0 is disposed between the engine 2 and the motor MG on a power transmission path, and is capable of disconnecting the engine 2. The motor MG includes a stator 3a and a rotor 3b drivingly connected to a drive shaft 3c. A mechanical oil pump 21 is drivingly connected to the drive shaft 3c. That is, the mechanical oil pump 21 is drivingly connected to the drive shaft 3c that is drivingly connected to the motor MG, and is also drivingly connected to the engine 2 by engaging the clutch K0, thereby being driven by at least one of a driving force of the motor MG and a driving force of the engine 2. Although illustration is omitted, a damper device or the like that smooths out pulsation of the engine 2 and transmits its rotation is generally provided between the engine 2 and the clutch K0.

The starting clutch WSC is disposed between the motor MG and the transmission mechanism 5 on the power transmission path, and is capable of connecting or disconnecting power transmission between each of the engine 2 and the motor MG (that is, the drive source) and the transmission mechanism 5. In particular, the starting clutch WSC is engaged when starting the vehicle. The transmission mechanism (T/M) 5 is provided on the power transmission path between each of the engine 2 and the motor MG and each of the front wheels 91L, 91R. The transmission mechanism 5 shifts drive rotation of the engine 2 and/or the motor MG input via the starting clutch WCS and transmits it to the differential device 6. The differential device 6 smooths out differential rotation between the left and right front wheels 91L, 91R and transmits the rotation from the transmission mechanism 5 to the front wheels 91L, 91R. In the present embodiment, the transmission mechanism 5 is a mechanism that achieves six forward speeds and reverse speed but is not limited to this. The transmission mechanism 5 may be a stepped transmission mechanism that achieves, for example, three to five forward speeds or seven or more forward speeds, or may be a continuously variable transmission mechanism such as a belt type continuously variable transmission or a toroidal continuously variable transmission. That is, the transmission mechanism 5 may be any type of transmission mechanism.

The control unit 31 includes a CPU 32, a RAM 33 that temporarily stores data, and a ROM 34 that stores processing programs. The control unit 31 outputs, from an output port, various signals such as a control signal to each solenoid valve of the hydraulic control device 40, a control signal to a control unit (not shown) of the engine 2, a control signal to the drive PCU 95 that controls drive of the motor MG, and a control signal to the drive circuit 60 that controls drive of the electric oil pump 22, thereby controlling these components. The drive PCU 95 includes a circuit for controlling the motor MG by PWM, and performs power running of the motor MG by supplying electric power from the battery 99 to the motor MG, or charges the battery 99 with electric power generated by regeneration in the motor MG.

The drive circuit 60 includes an inverter 61 that controls electric power to be supplied to an electric motor (not shown) of the electric oil pump 22 by PWM control, and a driver 62 that controls the inverter 61 by outputting command signals to switching elements (not shown) of the inverter 61. The electric power to be supplied to the electric oil pump 22 by the inverter 61 is supplied from a low-voltage battery (not shown) in the present embodiment, but may be supplied from the high-voltage battery 99 that stores electric power for traveling.

In the hybrid drive device 1 described above, the clutch K0, the motor MG, the starting clutch WSC, and the transmission mechanism 5 are sequentially disposed from the engine 2 side to the wheel 9 side. When the vehicle travels by driving both the engine 2 and the motor MG or driving the engine 2, the control unit (ECU) 31 controls the hydraulic control device 40 to engage the clutch K0 and the starting clutch WSC. During the EV traveling in which the vehicle travels only by the driving force of the motor MG, the clutch K0 is disengaged to disconnect the transmission path between the engine 2 and each of the front wheels 91L, 91R.

As described above, the hybrid drive device 1 includes the mechanical oil pump (MOP) 21 and the electric oil pump (E-OP) 22 as hydraulic pressure sources for generating a hydraulic pressure (source pressure) to be used in the hydraulic control device 40. The mechanical oil pump 21 is driven to rotate in conjunction with the engine 2 and the motor MG when the clutch K0 is engaged, and is driven to rotate in conjunction with the motor MG when the clutch K0 is disengaged. The electric oil pump 22 is electrically drivable by the electric motor (not shown) independently of the mechanical oil pump 21, and is controlled to be driven or stopped based on an electronic command from the control unit 31. The electric motor (not shown) that drives the electric oil pump 22 is used only to drive the electric oil pump 22. The electric motor is completely isolated from the transmission path between the engine 2 and each of the front wheels 91L, 91R, and does not transmit the driving force to the front wheels 91L, 91R.

[Water-Cooling Paths in Hybrid Electric Vehicle]

Next, water-cooling paths in the hybrid electric vehicle 100 will be described. The hybrid electric vehicle 100 has two different systems that are a path for supplying a high-temperature coolant and a path for supplying a low-temperature coolant. The high-temperature coolant is cooled to, for example, about 90° C. in a normal state by an HT radiator 111. The low-temperature coolant is cooled to, for example, 65° C. or lower in a normal state by an LT radiator 112.

A path through which refrigerant passes to circulate through a portion of the engine 2 or the like at a high temperature is routed for the high-temperature coolant. The low-temperature coolant cools the hybrid drive device 1 on the front wheel side and the rear motor 97 on the rear wheel side. Specifically, a path through which refrigerant passes to circulate through the drive PCU 95, the control unit 31, the drive circuit 60, the drive PCU 96, the rear motor 97, and the like is routed.

[Lubrication Paths in Hydraulic Control Device]

Next, cooling of each part by lubricating oil (cooling oil) in the hybrid drive device 1 will be described. As described above, in the hybrid electric vehicle 100, the engine 2 is cooled by the high-temperature coolant, and electric circuits, the rear motor 97, and other components are cooled by the low-temperature coolant. Thus, the cooling is so-called water cooling. The hybrid drive device 1 performs so-called oil cooling using oil such as an automatic transmission fluid for hydraulic control on the transmission mechanism 5. Hereinafter, description will be given of a portion of the hydraulic control device 40 that mainly generates a line pressure as the source pressure and a portion of the hydraulic control device 40 that supplies the lubricating oil.

As shown in FIG. 2, the hydraulic control device 40 roughly includes a primary regulator valve 42 that is a source pressure generation unit, a secondary regulator valve 43, a solenoid valve SRL1, a solenoid valve SRL2, a first lubrication switching valve 44 that is a switching valve, a second lubrication switching valve 45, and the like. The hydraulic control device 40 is supplied with a hydraulic pressure by being connected to the mechanical oil pump 21 and the electric oil pump 22 serving as the hydraulic pressure sources, and is communicatively connected to a cooler 70. Further, the hydraulic control device 40 is communicatively connected to a first lubrication circuit 81 that is a lubricating oil passage for supplying lubricating oil toward the starting clutch WSC, a second lubrication circuit 82 for supplying lubricating oil toward an outer peripheral side of the motor MG, a third lubrication circuit 83 for supplying lubricating oil toward the clutch K0, an inner peripheral side of the motor MG, and bearings (not shown), and a fourth lubrication circuit 84 for supplying lubricating oil toward each part of the transmission mechanism 5.

Specifically, when the electric oil pump 22 is driven by a command from the control unit 31, the electric oil pump 22 suctions oil from a strainer 20, generates a hydraulic pressure $P_{EOP}$ in oil passages b1, b2, and supplies the hydraulic pressure $P_{EOP}$ to an input port 44c of the first lubrication switching valve 44 described later. When a spool 44p of the first lubrication switching valve 44 described later is in an upper position in the figure, the electric oil pump 22 communicates with a pressure regulation port 42d of the primary regulator valve 42 via oil passages a6, a4, a2 from an output port 44e. That is, the hydraulic pressure $P_{EOP}$ generated by the electric oil pump 22 is supplied to a line pressure circuit.

A check ball 53 interposed between the oil passage b1 and the oil passage b2 is disposed so as to prevent a case where a line pressure PL regulated by the primary regulator valve 42 becomes higher than the hydraulic pressure $P_{EOP}$ output by the electric oil pump 22 to flow back to the electric oil pump 22. A check ball 51 connected to the oil passage b1 is closed by a spring (not shown). When the hydraulic pressure in the oil passage b1 is equal to or higher than a predetermined pressure, the check ball 51 prevents a high pressure from acting on the electric oil pump 22 by releasing the hydraulic pressure in the oil passage b1. That is, the electric oil pump 22 is protected.

The mechanical oil pump 21 driven by the engine 2 and/or the motor MG as described above suctions oil from the strainer 20, and generates a hydraulic pressure $P_{MOP}$ in oil passages a1, a2, a3, a4, a5, a6 serving as the line pressure circuit by opening a check ball 52. The pressure is regulated to the line pressure PL by the primary regulator valve 42 described later in detail. The check ball 52 prevents the hydraulic pressure $P_{EOP}$ from the electric oil pump 22 from flowing back to the mechanical oil pump 21 when the mechanical oil pump 21 is stopped as in a case where the vehicle is stopped during the EV traveling.

The primary regulator valve 42 includes a spool 42p, a spring 42s that urges the spool 42p to one side, a feedback oil chamber 42a, an operating oil chamber 42b, a discharge port 42c, and the pressure regulation port 42d. The spool 42p of the primary regulator valve 42 adjusts a communication amount (opening amount) between the pressure regulation port 42d and the discharge port 42c based on, for example, a control pressure $P_{SLT}$ output from a linear solenoid valve SLT (not shown) based on a throttle opening degree or the like, an urging force of the spring 42s, and a feedback pressure fed back to the feedback oil chamber 42a via the oil passage a3, thereby regulating the hydraulic pressure in the oil passages a1 to a6 connected to the pressure regulation port 42d to the line pressure PL serving as the source pressure.

The line pressure PL thus regulated by the primary regulator valve 42 is supplied, via the oil passage a5, to an engagement circuit (T/M circuit) 47 serving as an engagement control hydraulic circuit that controls the supply of an engagement pressure to hydraulic servos of the clutches (including the clutch K0 and the starting clutch WSC) and the brakes of the transmission mechanism 5, and is regulated by a solenoid valve or the like that is electronically controlled by the control unit 31. The engagement pressure is supplied to the hydraulic servos to freely control each of the clutches and the brakes into a disengaged state, a slip-engaged state, or a fully-engaged state. The line pressure PL is also supplied to a modulator valve (not shown) and a modulator pressure $P_{MOD}$ obtained by reducing the line pressure $P_L$ to a predetermined pressure or lower is output.

The hydraulic pressure discharged from the discharge port 42c of the primary regulator valve 42 is supplied to oil passages c1, c2, c3, c4, c5, c6, c7, c8, c9, c10, c11, c12, c13. In particular, the hydraulic pressure is regulated to a secondary pressure $P_{SEC}$ by being supplied to the secondary regulator valve 43 from the oil passage c4.

The secondary regulator valve 43 has substantially the same structure as that of the primary regulator valve 42, and includes a spool 43p, a spring 43s that urges the spool 43p to one side, a feedback oil chamber 43a, an operating oil chamber 43b, a pressure regulation port 43c, and a discharge port 43d. The spool 43p of the secondary regulator valve 43 adjusts a communication amount (opening amount) between the pressure regulation port 43c and the discharge port 43d based on the control pressure $P_{SLT}$, an urging force of the spring 43s, and a feedback pressure fed back to the feedback oil chamber 43a via the oil passage c4, thereby regulating the hydraulic pressure in the oil passages c1 to c13 connected to the pressure regulation port 43c as the secondary pressure $P_{SEC}$.

The secondary pressure $P_{SEC}$ regulated by the pressure regulation port 43c of the secondary regulator valve 43 is supplied, as a lubricating pressure, to an input port 45c of the second lubrication switching valve 45 described later from the oil passage c6, to the cooler 70 from the oil passage c7, to c8 after the cooling by the cooler 70, to the fourth lubrication circuit 84 via the oil passage c9, to the third lubrication circuit 83 via the oil passage c10, to the second lubrication circuit 82 via the oil passage c11, and to the first lubrication circuit 81 via the oil passages c12, c13. In the present embodiment, the oil passages c5, c7, c8, c12, c13 constitute a supply oil passage for supplying, to the first lubrication circuit 81, the lubricating oil supplied from the primary regulator valve 42.

A check ball 54 blocks a backflow from the oil passage c12 to the secondary regulator valve 43 (from downstream to upstream) when the first lubrication switching valve 44 is switched and the hydraulic pressure $P_{EOP}$ of the electric oil pump 22 is supplied to oil passages e2, c13 as described later in detail. The check ball 54 is disposed downstream of the second lubrication circuit 82 to the fourth lubrication circuit 84 in the oil passages c1 to c13 of the lubricating oil flowing from the secondary regulator valve 43 toward the first lubrication circuit 81. The check ball 54 prevents the hydraulic pressure $P_{EOP}$ of the electric oil pump 22 from flowing into the second lubrication circuit 82 to the fourth lubrication circuit 84 when the hydraulic pressure $P_{EOP}$ is supplied to the oil passages e2, c13. The hydraulic pressure discharged from the discharge port 43d of the secondary regulator valve 43 is returned, as a surplus pressure, to a suction port (not shown) of the mechanical oil pump 21 via an oil passage d1, thereby reducing a drive load on the mechanical oil pump 21 and drive loads on the engine 2 and the motor MG to improve the fuel efficiency of the vehicle.

The solenoid valve SRL1 is, for example, of a normally closed type and freely outputs a signal pressure $P_{SL1}$. Specifically, the modulator pressure $P_{MOD}$ described above is input, and the solenoid valve SRL1 outputs a signal pressure $P_{SRL1}$ to an operating oil chamber 44a of the first lubrication switching valve 44 described later via an oil passage f1 under ON control by a command from the control unit 31, and does not output the signal pressure $P_{SRL1}$ under OFF control.

Similarly, the solenoid valve SRL2 is, for example, of a normally closed type and freely outputs a signal pressure $P_{SL2}$. Specifically, the modulator pressure $P_{MOD}$ described above is input, and the solenoid valve SRL2 outputs a signal pressure $P_{SRL2}$ to an operating oil chamber 45a of the second lubrication switching valve 45 described later via an oil passage g1 under ON control by a command from the control unit 31, and does not output the signal pressure $P_{SRL2}$ under OFF control.

The first lubrication switching valve 44 includes the spool 44p, a spring 44s that urges the spool 44p to one side, the operating oil chamber 44a, an input port 44b, an output port 44d, the input port 44c, and the output port 44e. In the first lubrication switching valve 44, when the spool 44p is urged to an upper position in the figure by an urging force of the spring 44s, the input port 44b and the output port 44d communicate with each other and the input port 44c and the output port 44e communicate with each other. When the signal pressure $P_{SRL1}$ is input from the oil passage f1 and the spool 44p is in a lower position in the figure against the urging force of the spring 44s, the input port 44c and the output port 44d communicate with each other and the input port 44b and the output port 44e are disconnected.

The second lubrication switching valve 45 includes a spool 45p, a spring 45s that urges the spool 45p to one side, the operating oil chamber 45a, an output port 45b, the input port 45c, an input port 45d, and an output port 45e. In the second lubrication switching valve 45, when the spool 45p is urged to an upper position in the figure by an urging force of the spring 45s, the input port 45d and the output port 45e communicate with each other and the input port 45c is disconnected. When the signal pressure $P_{SL2}$ is input from the oil passage g1 and the spool 45p is in a lower position in the figure against the urging force of the spring 45s, the input port 45c and the output port 45b communicate with each other and the input port 45d is disconnected.

The modulator pressure $P_{MOD}$ is input to the input port 45d. A hydraulic switch 49 that electrically outputs an ON signal to the control unit 31 when a hydraulic pressure equal to or higher than a predetermined pressure is input is connected to the output port 45e. Therefore, the hydraulic switch 49 receives an input of the modulator pressure $P_{MOD}$ when the spool 45p is in the upper position in the figure, and detects whether the second lubrication switching valve 45 is in the lower position in the figure. Particularly when the hydraulic switch 49 does not output the ON signal under the OFF control on the solenoid valve SRL2, the control unit 31 detects an abnormal state in which the spool 45p of the second lubrication switching valve 45 sticks to the lower position in the figure.

Next, operations of the hydraulic control device 40 will be described. When an oil temperature detected by an oil temperature sensor 41 is normal temperature and the starting clutch WSC is in the engaged state or the disengaged state (not in the slip state), both the solenoid valve SRL1 and the solenoid valve SRL2 are subjected to OFF control as a normal state. The first lubrication switching valve 44 comes into the upper position in the figure and the second lubrication switching valve 45 also comes into the upper position in the figure.

In the normal state, when the engine 2 or the motor MG is driven, the mechanical oil pump 21 generates the hydraulic pressure $P_{MOP}$ toward the oil passage a1. When the electric oil pump 22 is subjected to ON control, the electric oil pump 22 generates the hydraulic pressure $P_{EOP}$ toward the oil passage b1, and communicates with the pressure regulation port 42d of the primary regulator valve 42 via the oil passages b1, b2, the input port 44c and the output port 44e of the first lubrication switching valve 44, and the oil passage a6. That is, the primary regulator valve 42 regulates the line pressure PL and the secondary regulator valve 43 regulates the secondary pressure $P_{SEC}$ based on one or both of the hydraulic pressure $P_{MOP}$ and the hydraulic pressure $P_{EOP}$ (first state).

When the secondary pressure $P_{SEC}$ is supplied to the oil passages c1 to c13 as the lubricating pressure as described above, the lubricating oil that flows based on the lubricating pressure is supplied to the first lubrication circuit 81, the second lubrication circuit 82, the third lubrication circuit 83, and the fourth lubrication circuit 84 through the cooler 70 because the input port 45c and the output port 45b of the second lubrication switching valve 45 are disconnected. This state may be regarded as a low-flow rate state because the amount of lubricating oil supplied to the starting clutch WSC is smaller than that in a high-flow rate state described later.

When the oil temperature detected by the oil temperature sensor 41 is normal temperature, the control unit 31 determines to start the vehicle, and the engagement pressure is supplied to the hydraulic servo of the starting clutch WSC to engage the starting clutch WSC, the solenoid valve SRL2 is subjected to OFF control and the solenoid valve SRL1 is subjected to ON control. With the signal pressure $P_{SRL1}$, the spool 44p of the first lubrication switching valve 44 is switched to the lower position in the figure. At this time, the mechanical oil pump 21 is driven because the vehicle is started by the driving force of the engine 2 or the motor MG.

In this state, the secondary pressure $P_{SEC}$ serves as the lubricating pressure and the lubricating oil that flows based on the lubricating pressure is supplied to the second lubrication circuit 82, the third lubrication circuit 83, and the fourth lubrication circuit 84 through the cooler 70 as described above. Since the spool 44p of the first lubrication switching valve 44 is switched to the lower position in the figure, the hydraulic pressure $P_{EOP}$ of the electric oil pump 22 that is input to the input port 44c is output from the output port 44d to the oil passage e2 and supplied to the first lubrication circuit 81 via the oil passage c13 (second state). Thus, the hydraulic pressure $P_{EOP}$ of the electric oil pump 22 that is supplied to the oil passage a6 and also to the engagement circuit 47 (clutches, etc.) and to the second to fourth lubrication circuits 82 to 84 via the secondary regulator valve 43 is directly supplied to the first lubrication circuit 81. In other words, the hydraulic pressure $P_{EOP}$ higher than the secondary pressure $P_{SEC}$ serves as the lubricating pressure and the lubricating oil can be supplied at a flow rate higher than the flow rate in a case where the lubricating pressure is supplied to the first lubrication circuit 81 based on the secondary pressure $P_{SEC}$. That is, the lubricating oil is supplied to the starting clutch WSC in the high-flow rate state. Thus, it is possible to sufficiently lubricate (cool) the starting clutch WSC that generates a large amount of heat by slip engagement when starting the vehicle.

Since the hydraulic pressure $P_{EOP}$ of the electric oil pump 22 is higher than the secondary pressure $P_{SEC}$, the check ball 54 does not open and the lubricating oil is supplied to the first lubrication circuit 81 by the hydraulic pressure $P_{EOP}$ of the electric oil pump 22 independently of the second lubrication circuit 82 to the fourth lubrication circuit 84.

When the slip engagement of the starting clutch WSC is finished and the engaged state is achieved, the control unit 31 performs OFF control on the solenoid valve SRL1 to return the spool 44$p$ of the first lubrication switching valve 44 to the upper position in the figure. Therefore, the lubricating oil is supplied to the first lubrication circuit 81 to the fourth lubrication circuit 84 via the cooler 70, and the hydraulic pressure $P_{EOP}$ of the electric oil pump 22 is used as the source pressure for the line pressure PL and the secondary pressure $P_{SEC}$.

When the oil temperature detected by the oil temperature sensor 41 is a low temperature, the control unit 31 determines to start the vehicle, and the engagement pressure is supplied to the hydraulic servo of the starting clutch WSC to engage the starting clutch WSC, the solenoid valve SRL1 is subjected to OFF control and the solenoid valve SRL2 is subjected to ON control. With the signal pressure $P_{SRL2}$, the spool 45$p$ of the second lubrication switching valve 45 is switched to the lower position in the figure.

At this time, the mechanical oil pump 21 is driven because the vehicle is started by the driving force of the engine 2 or the motor MG, but the electric oil pump 22 cannot be driven because the oil temperature is low and the viscosity of the oil is high (if the electric oil pump 22 is driven, the durability of the electric oil pump 22 is affected).

Since the electric oil pump 22 is stopped in this state, the line pressure PL and the secondary pressure $P_{SEC}$ are regulated based on the hydraulic pressure $P_{MOP}$ of the mechanical oil pump 21. Since the electric oil pump 22 is stopped at this time, the line pressure PL is supplied to the oil passage b2 via the oil passage a6 and the first lubrication switching valve 44, but the pressure PL does not flow back to the electric oil pump 22 by the check ball 53.

Since the second lubrication switching valve 45 is switched to the lower position in the figure, the secondary pressure $P_{SEC}$ supplied to the oil passage c6 is supplied to an oil passage e1 via the input port 45$c$ and the output port 45$b$. Since the first lubrication switching valve 44 is switched to the upper position in the figure, the secondary pressure $P_{SEC}$ is supplied to the oil passage e2 via the input port 44$b$ and the output port 44$d$ and to the first lubrication circuit 81 via the oil passage c13. In other words, the lubricating oil is supplied to the first lubrication circuit 81 via the oil passages c6, e1, e2 serving as a second oil passage that is in the oil passages c1 to c13 serving as a first oil passage for supplying the hydraulic pressure $P_{MOP}$ of the mechanical oil pump 21 (secondary pressure $P_{SEC}$) to the first lubrication circuit 81 via the cooler 70 and that communicates the upstream side (oil passage c5) and the downstream side (oil passage c13) across the cooler 70 by switching the second lubrication switching valve 45. Therefore, the second lubrication switching valve 45 is interposed in the oil passages c6, e1, e2 serving as the second oil passage and switches the second oil passage from the disconnected state to the communicating state.

The secondary pressure $P_{SEC}$ is also supplied to the oil passages c8 to c11 from the oil passage c7 via the cooler 70, and the lubricating oil is also supplied to the second lubrication circuit 82 to the fourth lubrication circuit 84. However, the hydraulic pressure loss is large and the channel resistance in the cooler 70 is large because the viscosity of the oil is high in the cooler 70. Therefore, the lubricating pressure supplied based on the secondary pressure $P_{SEC}$ flows into the oil passage c6 in its majority and hardly flows into the oil passage c7. Thus, the hydraulic pressure in the oil passages c8 to c11 is lower than that in the oil passage c3, and the check ball 54 is closed. Accordingly, sufficient lubricating oil can be supplied to the first lubrication circuit 81 during the slip engagement of the starting clutch WSC by supplying the lubricating oil to the first lubrication circuit 81 while bypassing the cooler 70, compared with a case where the oil temperature is low and the lubricating oil is supplied to the first lubrication circuit 81, for example, via the cooler 70.

When the slip engagement of the starting clutch WSC is finished and the engaged state is achieved, the control unit 31 performs OFF control on the solenoid valve SRL2 to return the spool 45$p$ of the second lubrication switching valve 45 to the upper position in the figure. Therefore, the lubricating oil is supplied to the first lubrication circuit 81 to the fourth lubrication circuit 84 via the cooler 70.

If the spool 45$p$ of the second lubrication switching valve 45 remains in the abnormal state in which the spool 45$p$ sticks to the lower position in the figure, the secondary pressure $P_{SEC}$ can be supplied to the first lubrication circuit 81 when the oil temperature is low. When the oil temperature increases to normal temperature, however, the oil hardly flows into the cooler 70 to cause a possibility that the cooling for reducing the oil temperature does not progress and a possibility that the supply of the lubricating oil to the second lubrication circuit 82 to the fourth lubrication circuit 84 is insufficient. When a large amount of lubricating oil flows into the first lubrication circuit 81 and the starting clutch WSC is lubricated excessively, the drag resistance of the starting clutch WSC increases to hinder improvement in the fuel efficiency of the vehicle.

In view of this, the control unit 31 determines that the second lubrication switching valve 45 is in the abnormal state when the hydraulic switch 49 outputs the ON signal though the solenoid valve SRL2 is subjected to OFF control. The control unit 31 performs ON control on the solenoid valve SRL1 to switch the spool 44$p$ of the first lubrication switching valve 44 to the lower position in the figure instead of disconnecting the oil passage c6 and the oil passage e1 by using the second lubrication switching valve 45. Therefore, the oil passage e1 and the oil passage e2 are disconnected to prevent the secondary pressure $P_{SEC}$ from flowing directly into the first lubrication circuit 81 and cause the secondary pressure $P_{SEC}$ to flow into the cooler 70. When the spool 44$p$ of the first lubrication switching valve 44 is in the upper position in the figure, the hydraulic pressure $P_{EOP}$ of the electric oil pump 22 flows into the first lubrication circuit 81 (similarly to the high-lubrication state described above). If a high flow rate is not required for the first lubrication circuit 81, this situation can be addressed by stopping the electric oil pump 22. In this case, it is preferable not to stop the engine 2, that is, to constantly drive the mechanical oil pump 21.

[Coolant Temperature Handling Control]

Next, coolant temperature handling control to be performed by the control unit 31 according to the present embodiment will be described with reference to FIGS. 3 and 4. When the temperature of the drive circuit 60 (see FIG. 1) that supplies electric power to the electric oil pump 22 is equal to or higher than a temperature T4 that is a high temperature as shown in FIG. 4, the value of a permissible current that can energize the inverter 61 decreases so as not to affect the durability of the inverter 61. The inverter 61 of the drive circuit 60 that is cooled by the low-temperature coolant as described above has substantially the same temperature as the coolant temperature. Therefore, the temperature of the low-temperature coolant that is detected by a coolant temperature sensor (not shown) can be regarded as being synonymous with the temperature of the inverter 61.

Although the low-temperature coolant is cooled by the LT radiator 112, the coolant also cools the rear motor 97 in particular, and therefore the temperature of the coolant may increase when the traveling continues by using the rear motor 97. When the control unit 31 issues a command to drive the electric oil pump 22 as in the normal state while the temperature of the inverter 61 exceeds the temperature T4, the inverter 61 is controlled by PWM based on a drive signal from the driver 62. Thus, a current exceeding the permissible current may flow. In view of this, the coolant temperature handling control is performed as described below.

The control unit 31 starts the coolant temperature handling control shown in FIG. 3, for example, when a start switch of the hybrid electric vehicle 100 is turned ON. As shown in FIG. 3, in the state in which the control unit 31 has started the coolant temperature handling control, the control unit 31 first determines whether a coolant temperature T of the low-temperature coolant has exceeded a first start temperature $T1a$ (second temperature) slightly higher than a temperature T0 (for example, 65° C.) to be reached by the cooling with the LT radiator 112 (S1) (see FIG. 4). When the coolant temperature T is equal to or lower than the first start temperature $T1a$ (No in S1), no special restriction process is performed (S10), and this state is maintained.

For example, when the coolant temperature T increases and exceeds the first start temperature $T1a$ (Yes in S1) (see FIG. 4), the control unit 31 proceeds to step S2 to transmit a start request signal to the control unit of the engine 2, issue a command to start the engine 2, for example, when the engine 2 is stopped, and perform a process for maintaining the engine 2 in a driving state (heat generation amount reduction process). In other words, the control unit 31 performs a process for driving the mechanical oil pump 21 by the engine 2 and reducing the hydraulic pressure generated by the electric oil pump 22. The control unit 31 commands the hydraulic control device 40 to drive a solenoid valve (not shown) and increase the engagement pressure of the clutch K0, thereby engaging the clutch K0. Therefore, the mechanical oil pump 21 is driven and the line pressure PL is generated mainly by the hydraulic pressure generated by the mechanical oil pump 21. Thus, the load on the electric oil pump 22 is reduced greatly. Accordingly, the current supplied to the electric oil pump 22 decreases and does not exceed the permissible current (see FIG. 4). Further, the amount of heat given (absorbed) to the low-temperature coolant can be reduced, thereby obtaining an effect of suppressing a temperature increase of the low-temperature coolant.

In the present embodiment, the mechanical oil pump 21 is driven by starting the engine 2. For example, when the remaining charge level of the battery 99 is sufficient, the mechanical oil pump 21 may be driven by driving the motor MG while the clutch K0 is disengaged and the engine 2 is stopped.

While the process of step S2 is being performed, the control unit 31 determines whether the coolant temperature T exceeds a second start temperature $T2a$ (S4) (see FIG. 4). When the coolant temperature T is equal to or lower than the second start temperature $T2a$ that is higher than the first start temperature $T1a$ (No in S4), the control unit 31 determines whether the coolant temperature T is equal to or lower than a first termination temperature $T1b$ that is higher than the temperature T0 and lower than the first start temperature $T1a$ (S3). When the coolant temperature T is lower than the second start temperature $T2a$ (No in S4) and equal to or higher than the first termination temperature $T1b$ (No in S3), the control unit 31 proceeds directly to step S2 to maintain the state in which the mechanical oil pump 21 is driven by the engine 2. When the coolant temperature T decreases to the first termination temperature $T1b$ or lower (Yes in S3) (see FIG. 4), the control unit 31 returns to step S10 to return to the state in which no special restriction process is performed. For example, when the EV traveling that does not require the driving force of the engine 2 can be performed, the engine 2 is stopped and the mechanical oil pump 21 is also stopped. Thus, the hydraulic pressure (line pressure) is generated by the electric oil pump 22.

When the coolant temperature T is not equal to or lower than the first termination temperature $T1b$ and further increases to exceed the second start temperature $T2a$ (third temperature) (Yes in S4) (see FIG. 4), the control unit 31 proceeds to step S5 to perform ON control on the solenoid valve SRL1 of the hydraulic control device 40 (see FIG. 2) to switch the spool $44p$ of the first lubrication switching valve 44 to the lower position in the figure and disconnect the oil passage b2 and the oil passage a4 while maintaining the state in which the mechanical oil pump 21 is driven by the engine 2 as described above, thereby prohibiting the hydraulic pressure of the electric oil pump 22 from being supplied as the hydraulic pressure for the line pressure PL to be regulated by the primary regulator valve 42. That is, the control unit 31 performs a process for prohibiting assistance for the generation of the line pressure PL by the electric oil pump 22 (heat generation amount reduction process) while the line pressure PL is being generated by the hydraulic pressure of the mechanical oil pump 21. In other words, the control unit 31 performs a process in which the hydraulic pressure generated by the electric oil pump 22 is not used to generate the line pressure PL. This eliminates the need for the electric oil pump 22 to output a hydraulic pressure equal to or higher than the line pressure PL. Thus, the load on the electric oil pump 22 is reduced greatly. Accordingly, the current supplied to the electric oil pump 22 decreases and does not exceed the permissible current (see FIG. 4). Further, the amount of heat given (absorbed) to the low-temperature coolant can be reduced, thereby obtaining the effect of suppressing a temperature increase of the low-temperature coolant.

When slip-engaging the starting clutch WSC while prohibiting the assistance for the generation of the line pressure PL by the electric oil pump 22, the lubricating oil can be supplied from the electric oil pump 22 to the starting clutch WSC. That is, the high-flow rate state described above can be achieved. When the engagement of the starting clutch WSC is completed or when the starting clutch WSC is disengaged, the drive of the electric oil pump 22 is reduced to reduce the amount of lubricating oil from the electric oil pump 22.

While the process of step S5 is being performed, the control unit 31 determines whether the coolant temperature T exceeds a third start temperature T3a that is higher than the second start temperature T2a (S7) (see FIG. 4). When the coolant temperature T is equal to or lower than the third start temperature T3a (No in S7), the control unit 31 determines whether the coolant temperature T is equal to or lower than a second termination temperature T2b that is higher than the first start temperature T1a and lower than the second start temperature T2a (S6). When the coolant temperature T is lower than the third start temperature T3a (No in S7) and equal to or higher than the second termination temperature T2b (No in S6), the control unit 31 proceeds directly to step S5 to maintain the state in which the mechanical oil pump 21 is driven by the engine 2 and the state in which the assistance for the generation of the line pressure by the electric oil pump 22 is prohibited. When the coolant temperature T decreases to the second termination temperature T2b or lower (Yes in S6) (see FIG. 4), the control unit 31 returns to step S2 to cancel the state in which the assistance for the generation of the line pressure by the electric oil pump 22 is prohibited. Therefore, the solenoid valve SRL1 of the hydraulic control device 40 is subjected to OFF control (see FIG. 2), that is, the hydraulic control device 40 is returned to the normal control state.

When the coolant temperature T is not equal to or lower than the second termination temperature T2b and further increases to exceed the third start temperature T3a (first temperature) (Yes in S7) (see FIG. 4), the control unit 31 proceeds to step S8 to turn OFF and stop the driver 62 of the drive circuit 60 (for example, cut off the power supply) and not to drive the inverter 61 to prevent the drive of the electric oil pump 22 while maintaining the state in which the mechanical oil pump 21 is driven by the engine 2 as described above. That is, the control unit 31 performs a process for shutting down (stopping) the electric oil pump 22. As a result, the current does not flow particularly through the inverter 61 and does not exceed the permissible current (see FIG. 4). Therefore, the inverter 61 can be protected. Further, the amount of heat given (absorbed) to the low-temperature coolant can be reduced, thereby obtaining the effect of suppressing a temperature increase of the low-temperature coolant.

In the present embodiment, description has been given of the case where the electric oil pump 22 is shut down such that the inverter 61 is brought into a non-driving state by turning OFF the driver 62. However, the present disclosure is not limited to this. The inverter 61 may be brought into the non-driving state by issuing a command to the driver 62 from the control unit 31. When the control is performed by the control unit 31, however, a standby current flows because the driver 62 stands by in an energized state. Therefore, the amount of heat generated in the drive circuit 60 can further be reduced when the power supply to the driver 62 is cut off.

When the electric oil pump 22 is shut down, the starting clutch WSC cannot be lubricated in the high-flow rate state, but the secondary pressure $P_{SEC}$ is supplied to the starting clutch WSC via the cooler 70 as described above. Therefore, the durability of the starting clutch WSC is not affected greatly.

While the process of step S8 is being performed, the control unit 31 determines whether the coolant temperature T is equal to or lower than a third termination temperature T3b that is higher than the second start temperature T2a and lower than the third start temperature T3a (S9). When the coolant temperature T is equal to or higher than the third termination temperature T3b (No in S9), the control unit 31 proceeds directly to step S8 to maintain the state in which the mechanical oil pump 21 is driven by the engine 2 and the state in which the electric oil pump 22 is shut down. When the coolant temperature T decreases to the third termination temperature T3b or lower (Yes in S9) (see FIG. 4), the control unit 31 returns to step S5 to cancel the state in which the electric oil pump 22 is shut down. Therefore, when slip-engaging the starting clutch WSC, the lubricating oil can be supplied from the electric oil pump 22 to the starting clutch WSC in the high-flow rate state.

When the coolant temperature T gradually decreases, the state returns to that in step S10 via the control in step S2 as described above, that is, returns to the normal control state.

SUMMARY OF EMBODIMENT

A vehicle drive device (1) includes:
a drive shaft (3c) to be driven by a drive source (2);
a rotation transmission unit (4) that transmits rotation input from the drive shaft (3c) to a wheel (91L, 91R);
a mechanical oil pump (21) that generates a hydraulic pressure by the rotation of the drive shaft (3c);
an electric oil pump (22) that electrically generates a hydraulic pressure;
a hydraulic control device (40) that supplies lubricating oil to the rotation transmission unit (4) based on the hydraulic pressures generated by the mechanical oil pump (21) and the electric oil pump (22);
a drive circuit (60) that controls electric power to be supplied to the electric oil pump (22); and
a control unit (31) that controls a drive condition of the drive circuit (60), in which
the control unit (31) stops the drive circuit (60) when a temperature of refrigerant for cooling the drive circuit (60) is equal to or higher than a first temperature (T3a).

Therefore, when the coolant temperature T exceeds the third start temperature T3a, the current does not flow through the inverter 61 and does not exceed the permissible current. Thus, the inverter 61 can be protected.

In the vehicle drive device (1),
the rotation transmission unit (4) includes a transmission mechanism (5) that shifts the rotation input from the drive shaft (3c) and transmits the rotation to the wheel (91L, 91R), and a starting clutch (WSC) interposed between the drive shaft (3c) and the transmission mechanism (5) and to be engaged at a time of starting, and
the hydraulic control device (40) supplies the lubricating oil to the starting clutch (WSC) based on the hydraulic pressures generated by the mechanical oil pump (21) and the electric oil pump (22).

Therefore, the starting clutch that generates heat at the time of starting can be cooled by the hydraulic pressures generated by the mechanical oil pump 21 and the electric oil pump 22. When the coolant temperature T exceeds the third start temperature T3a, the starting clutch can be cooled by the hydraulic pressure generated by the mechanical oil pump 21.

In the vehicle drive device (1),
the control unit (31) performs a heat generation amount reduction process for reducing an amount of heat generated by the drive circuit (60) when the temperature of the refrigerant is equal to or higher than a second temperature (T1$a$) that is lower than the first temperature (T3$a$).

Therefore, the amount of heat given to the low-temperature coolant can also be reduced, and the temperature increase of the low-temperature coolant can be suppressed.

In the vehicle drive device (1),
the control unit (31) performs, as the heat generation amount reduction process, a process for reducing the hydraulic pressure generated by the electric oil pump (22) by driving the mechanical oil pump (21) through drive of the drive shaft (3$c$) by the drive source (2) when the temperature of the refrigerant is equal to or higher than the second temperature (T1$a$).

Therefore, the current supplied to the electric oil pump 22 decreases and does not exceed the permissible current. Further, the amount of heat given to the low-temperature coolant can be reduced.

In the vehicle drive device (1),
the hydraulic control device (40) includes a source pressure generation unit (42) that generates a source pressure based on the hydraulic pressure generated by at least one of the mechanical oil pump (21) and the electric oil pump (22), and
the control unit (31) performs, as the heat generation amount reduction process, a process for preventing the hydraulic pressure generated by the electric oil pump (22) from being used for generation of the source pressure when the temperature of the refrigerant is equal to or higher than a third temperature (T2$a$) that is higher than the second temperature (T1$a$).

This eliminates the need for the electric oil pump 22 to output a hydraulic pressure equal to or higher than the line pressure PL. Thus, the load on the electric oil pump 22 can be reduced greatly. Therefore, the current supplied to the electric oil pump 22 decreases and does not exceed the permissible current. Further, the amount of heat given to the low-temperature coolant can be reduced.

The vehicle drive device (1) further includes
a lubricating oil passage (81) through which the lubricating oil is supplied to the starting clutch (WSC), in which
the hydraulic control device (40) includes:
a supply oil passage (c5, c7, c8, c12, c13) through which the lubricating oil supplied from the source pressure generation unit (42) is supplied to the lubricating oil passage (81); and
a switching valve (44) switchable between a first state in which the hydraulic pressure generated by the electric oil pump (22) is supplied to the source pressure generation unit (42) and a second state in which the hydraulic pressure generated by the electric oil pump (22) is supplied to the lubricating oil passage (81), and
when the temperature of the refrigerant is equal to or higher than the third temperature (T2$a$) at a time of starting a vehicle by slip-engaging the starting clutch (WSC), the switching valve (44) is switched to the second state to supply the hydraulic pressure from the electric oil pump (22) to the lubricating oil passage (81).

Therefore, when slip-engaging the starting clutch WSC while prohibiting the assistance for the generation of the line pressure PL by the electric oil pump 22, the lubricating oil can be supplied from the electric oil pump 22 to the starting clutch WSC.

Possibilities of Other Embodiments

In the present embodiment described above, the vehicle drive device is a so-called parallel hybrid drive device that includes the motor MG and is capable of assisting the driving force of the engine 2 with the driving force of the motor MG and performing regeneration. However, the present disclosure is not limited to this. For example, an automatic transmission that does not include the motor MG and shifts the drive rotation of the engine 2 may be used. That is, any vehicle drive device may be used as long as the mechanical oil pump and the electric oil pump are provided and any part of the rotation transmission unit 4 is lubricated. The present technology can effectively be utilized in any of these vehicle drive devices that lubricates a component such as a starting clutch that generates a large amount of heat at the time of starting.

In the present embodiment, description has been given of the stepwise control that proceeds depending on the coolant temperature T as follows. When the coolant temperature T exceeds the first start temperature T1$a$, the engine 2 (mechanical oil pump 21) is started (first step). When the coolant temperature T exceeds the second start temperature T2$a$, the electric oil pump 22 is prohibited from assisting the line pressure PL (second step). When the coolant temperature T exceeds the third start temperature T3$a$, the electric oil pump 22 is shut down (third step). However, the present disclosure is not limited to this. For example, the control may be performed in one step as in a case where the engine 2 is started and the electric oil pump 22 is shut down when the coolant temperature T exceeds the third start temperature T3$a$. For example, the control may be performed in two steps as in a case where the second step of prohibiting the assist in the line pressure PL is omitted.

In the present embodiment, description has been given of the case where the mechanical oil pump 21 is started and the electric oil pump 22 is prohibited from assisting the line pressure PL to reduce the amount of heat generated by the drive circuit 60 until the coolant temperature T exceeds the third start temperature T3$a$ after exceeding the first start temperature T1$a$. However, the present disclosure is not limited to this. For example, any process may be performed as long as the amount of heat generated by the drive circuit 60 can be reduced as in a case where the current value of the inverter 61 of the drive circuit 60 is limited.

DESCRIPTION OF THE REFERENCE NUMERALS

1 . . . vehicle drive device (hybrid drive device)/2 . . . drive source (engine)/3$c$ . . . drive shaft/4 . . . rotation transmission unit/5 . . . transmission mechanism/21 . . . mechanical oil pump/22 . . . electric oil pump/31 . . . control unit/40 . . . hydraulic control device/42 . . . source pressure generation unit (primary regulator valve)/44 . . . switching valve (first lubrication switching valve)/60 . . . drive circuit/81 . . . lubricating oil passage (first lubrication circuit)/91L, 91R . . . wheel/MG . . . drive source (motor)/S2, S5 . . . heat generation amount reduction process (step)/T3$a$ . . . first temperature (third start temperature)/T1$a$ . . . second temperature (first start temperature)/T2$a$ . . . third temperature (second start temperature)/WSC . . . starting clutch/c5, c7, c8, c12, c13 . . . supply oil passage

The invention claimed is:
1. A vehicle drive device comprising:
a drive shaft to be driven by a drive source;
a rotation transmission unit that transmits rotation input from the drive shaft to a wheel;
a mechanical oil pump that generates a hydraulic pressure by the rotation of the drive shaft;

an electric oil pump that electrically generates a hydraulic pressure;

a hydraulic control device that supplies lubricating oil to the rotation transmission unit based on the hydraulic pressures generated by the mechanical oil pump and the electric oil pump;

a drive circuit that controls electric power to be supplied to the electric oil pump; and a control unit that is able to control a drive condition of the drive circuit, wherein the control unit stops the drive circuit when a temperature of refrigerant for cooling the drive circuit is equal to or higher than a first temperature, the rotation transmission unit includes a transmission mechanism that shifts the rotation input from the drive shaft and transmits the rotation to the wheel, and a starting clutch interposed between the drive shaft and the transmission mechanism and to be engaged at a time of starting, the hydraulic control device supplies the lubricating oil to the starting clutch based on the hydraulic pressures generated by the mechanical oil pump and the electric oil pump, the control unit performs a heat generation amount reduction process for reducing an amount of heat generated by the drive circuit when the temperature of the refrigerant is equal to or higher than a second temperature that is lower than the first temperature, the control unit performs, as the heat generation amount reduction process, a process for reducing the hydraulic pressure generated by the electric oil pump by driving the mechanical oil pump through drive of the drive shaft by the drive source when the temperature of the refrigerant is equal to or higher than the second temperature, the hydraulic control device includes a source pressure generation unit that generates a source pressure based on the hydraulic pressure generated by at least one of the mechanical oil pump and the electric oil pump, and the control unit performs, as the heat generation amount reduction process, a process for preventing the hydraulic pressure generated by the electric oil pump from being used for generation of the source pressure when the temperature of the refrigerant is equal to or higher than a third temperature that is higher than the second temperature.

2. The vehicle drive device according to claim 1, further comprising a lubricating oil passage through which the lubricating oil is supplied to the starting clutch, wherein the hydraulic control device includes:

a supply oil passage through which the lubricating oil supplied from the source pressure generation unit is supplied to the lubricating oil passage; and a switching valve switchable between a first state in which the hydraulic pressure generated by the electric oil pump is supplied to the source pressure generation unit and a second state in which the hydraulic pressure generated by the electric oil pump is supplied to the lubricating oil passage, and when the temperature of the refrigerant is equal to or higher than the third temperature at a time of starting a vehicle by slip-engaging the starting clutch, the switching valve is switched to the second state to supply the hydraulic pressure from the electric oil pump to the lubricating oil passage.

\* \* \* \* \*